United States Patent
Signes

(10) Patent No.: US 6,549,206 B1
(45) Date of Patent: Apr. 15, 2003

(54) GRAPHIC SCENE ANIMATION SIGNAL, CORRESPONDING METHOD AND DEVICE

(75) Inventor: Julien M. Signes, Rennes (FR)

(73) Assignee: France Telecom and Telediffusion de France, Paris (FR)

( * ) Notice: Subject to any disclaimer, the term of this patent is extended or adjusted under 35 U.S.C. 154(b) by 0 days.

(21) Appl. No.: 09/462,445

(22) PCT Filed: Jul. 10, 1998

(86) PCT No.: PCT/FR98/01523
§ 371 (c)(1),
(2), (4) Date: Jun. 6, 2000

(87) PCT Pub. No.: WO99/03281
PCT Pub. Date: Jan. 21, 1999

(51) Int. Cl.$^7$ .............................................. G06T 17/00
(52) U.S. Cl. ...................................................... 345/473
(58) Field of Search ................................ 345/426, 427, 345/473, 474; 707/104

(56) References Cited

U.S. PATENT DOCUMENTS

| | | | | |
|---|---|---|---|---|
| 5,818,463 A | * | 10/1998 | Tao et al. | 345/473 |
| 5,905,503 A | * | 5/1999 | Penna et al. | 345/473 |
| 6,058,397 A | * | 5/2000 | Barrus et al. | 707/104 |

OTHER PUBLICATIONS

Avaro et al.; "The MPEG—4 systems and description languages: A way ahead in audio visual information representation"; Signal Processing: Image Communication, vol. 4, No. 9, 1997; pp. 385–431.

Doenges, P. et al.; "MPEG—4: Audio/video and synthetic graphics/audio for mixed media"; Signal Processing Image Communication; vol. 4, No. 9, 1997; pp. 433–463.

Mulroy; "VRML gets real the MPEG—4 way"; Colloquium on teleconferencing futures; Jun. 17, 1997; pp. 4.1–4.4; XP–002060164; London, UK.

Arikawa et al.; "Dynamic LoD for QoS Management in the Next Generation VRML"; International Conference of Multimedia Computing and Systems; Jun. 17, 1996; pp. 24–27; XP–002060163.

Katkere, A. et al.; "Interactive video on WWW: Beyond VCR—like interfaces"; Computer Networks and ISDN Systems, vol. 11, No. 28, 1996; pp. 1559–1572.

International Search Report (PCT/ISA/220).

* cited by examiner

Primary Examiner—Cliff N. Vo
(74) Attorney, Agent, or Firm—Merchant & Gould P.C.

(57) ABSTRACT

The invention concerns a graphic scene animation data signal, designed for means constructing images capable of being displayed on at least one screen, said graphic scene having probably been loaded in said means constructing images, in the form of a set of objects, some of said objects at least having its own particular identifier, said signal comprising: a single animation mask, delivered as preamble to said animation, and assigning at least one of said objects to an elementary mask comprising: said object identifier, as defined in said graphic scene to be animated; and the designation of at least one dynamic characterization field of said object, representing a characteristic of said object capable of being modified; animation frames, comprising, according to the order defined by said mask, data updating said object dynamic characterization fields, so as to modify them, said constructing means decoding said animation mask data, and initializing the animation of the basis thereof, and updating the scene on the basis of said animation fields.

10 Claims, 3 Drawing Sheets

GRAPHIC SCENE ANIMATION SIGNAL, CORRESPONDING METHOD AND DEVICE

The present invention relates to the field of graphic scene restitution, for example on a multimedia terminal. More precisely, the invention relates to the transmission of animated scenes, or elements of such scenes.

Graphic scene is understood to mean the organization of a set of graphic objects, pictures and/or video in time and space. These graphic scenes can be in two or three dimensions and may contain various types of graphic parameters.

The invention applies particularly to any situation in which a compact, efficient representation of the animation of graphic scenes is required. This is, for example, the case:

in games and other multi-user network applications, such as cooperative work, in which there is a need to exchange, for example, new positions of objects;

multimedia consultancy services using 2D or 3D graphic objects.

Formats for the description of graphic scenes are already known. For example, standard ISO/IEC DIS 14772-1 describes the VRML 2.0 format. The MPEG-4 group of standards also defines a scene description format known as BIFS (Binary Format for Scene) that is based on VRML 2.0. The BIFS format is particularly present in the "MPEG-4 Systems Verification Model" (ISO/IEC JTC1, SC29/WG 11-N1693, MPEG 97, April 1997).

The purpose of this scene description format is to describe the spatio-temporal relations between the various graphics objects of a scene. It does this by defining a certain number of nodes or objects representative of all the graphics primitives that are to be represented. Each of these nodes has predefined fields that represent its features. In other words, the BIFS format makes it possible to transmit a scene structure in the form of a parametric description, or script.

Some attempts have been made to animate some types of scene. For example there is a format for facial animation defined by the SNHC group of MPEG-4 normalization ("The MPEG-4 SNHC Verification Model, ISO/TEC 1/SC29/WG11 N 1693, MPEG 97, April 1997). However, this format is specific to a given application, video telephones, and cannot be used elsewhere.

VRML language also defines two methods for transmitting animation of graphic scenes:

a first method based on linear interpolation that works by describing partial linear changes on parameters of the scene. This mechanism uses "ROUTE" instructions and "Interpolator" type nodes. The "ROUTES" are mechanisms of events used to define connections between fields such that when a first field changes value, the second field to which it is connected by a "ROUTE" also takes the same value;

a second method of describing animation uses scripts, i.e. functions that use a mathematical function to calculate new field values between scene shots.

These known methods present at least two major drawbacks.

First of all, they require recalculation of a value which can cause great complexity in the number of operations required to obtain the animation; this requires the terminal to be sufficiently powerful.

Moreover, these methods assume that the animation parameters are already known. This is clearly not the case where animations are used, for example, in a communications application.

It is a particular objective of the invention to overcome these various drawbacks in the state of the art.

More precisely, one objective of the invention is to provide a transmission structure for animation data as well as a method and corresponding device that will give animation that is simple to implement and will consume few transmission resources for all types of graphic scene, particularly those the development of which is not known beforehand.

In other words, the invention aims particularly to provide a technique for the animation of graphic scenes that meets at least one of the following criteria:

simplicity of data editing and interpreting;

low consumption of storage and/or transmission resources;

ability to animate all types of objects and graphic scenes;

possibility of animating objects, or nodes, in any way, i.e. not predefined.

Another objective of the invention is to provide this type of technique that will allow for the construction of cheap, simple multimedia terminals, i.e. not requiring either major computing means or major data storage means.

Yet another objective is to provide this type of technique that can be implemented on networks operating at a low transmission rate.

The invention also has the objective of providing this type of technique that is compatible with the VRMLS and MPEG-4 standards.

These objectives, as well as others that will appear more clearly below, are achieved according to the invention using a data animation signal of a graphic scene designed for image construction means that can be presented on at least one screen, said graphic scene to be animated having previously been loaded into said image construction means as a set of objects, at least some of which have their own identifier, the said signal comprising:

a single animation mask, delivered in advance to the said animation, and allocating to at least one of the said objects an elementary mask comprising:

the identifier of the said object as defined in the said graphic scene to be animated; and description of at least one dynamic characterization field of the said object, representing a characteristic of the said object that can be modified;

animation frames comprising, according to the order defined by the said mask, data updating said dynamic characterization fields of the said objects, such as to permit their modification, said construction means decoding the data of the said animation mask, and initializing the animation using the mask, and updating said scene according to said animation frames.

The animation of a scene is thus particularly simple and efficient. The quantity of data transmitted is limited, and it is not necessary for the terminals to be provided with major processing means. The use of the predefined mask enables the frames to be simplified and reduced.

In addition, it is possible to animate scenes without their development being known in advance. This makes it possible, for example, to implement all types of interactive applications.

Advantageously, each of the elementary masks comprises:

the identifier of the said object (ID);

a description block (bin mask) specifying the active dynamic fields capable of being modified during animation, and the dynamic fields that are invariable during animation;

possibly definition block (Qpi) of quantification data applicable to each of the said active dynamic fields.

At least certain of the said active dynamic fields may be multiple fields forming a vector. Under these circumstances the said elementary mask comprises a data item specifying whether all the fields forming the said vector or only certain among them are active, the said definition block being modified as a consequence.

According to one preferred embodiment, at least some of the said dynamic fields are coded, in at least some of the said animation frames, using predictive coding. Each animation frame thus associates a data item with every dynamic field specifying whether the field is coded in predictive or absolute mode.

Advantageously, each of the said animation frames comprises:
- a definition zone, indicating for each of the said objects whether its animation parameters are transmitted in the said animation frame;
- an animation data zone, delivering the information necessary to the animation of objects listed in the said definition zone.

In one embodiment the said animation data zone may comprise at least some of the data belonging to the group comprising:
- the type of coding (isIntra);
- a synchronization word (Sync);
- a synchronization reference or "time code" (IParam);
- a frequency value of the animation frames for the object in question (Iparam);
- a jump of N frames during which a data item will not be sent (IParam);
- an indication of change of value of quantification parameter(hasQP);
- a new quantification parameter value (QPi);
- a coded value of a dynamic field (Ivalue$_i$, or Pvalue$_i$).

The said dynamic fields may particularly belong to the group containing:
- fields defining the aspect of the said object;
- fields defining the position of the said object;
- fields defining the movement of the said object;
- fields defining the shape of the said object;
- fields defining the illumination of the said object;

The invention also relates to a process for transmitting animation data of a graphic scene, intended to be presented on at least one screen, comprising:
- an animation initialization stage in which transmission takes place of:
  - a single animation mask delivered as a preamble to the said animation, and allocating to at least one of the said objects an elementary mask comprising:
    - the identifier of the said object, as defined in the said graphic scene to be animated; and
    - description of at least one dynamic characterization field of the said object, representative of one characteristic of the said object that can be modified;
- an animation stage in which transmission takes place of animation frames comprising, according to the order defined by said mask, data updating the dynamic characterization fields of the said objects, enabling them to be modified.

Finally, the invention also relates to an animation device for a graphic scene designed to be presented on at least one screen, comprising:

means for constructing an initialization of the animation, using:
- a single animation mask, delivered in advance to the said animation, and allocating to at least one of the said objects an elementary mask comprising:
  - the identifier of the said object, as defined in the said graphic scene to be animated; and
  - description of at least one dynamic characterization field of the said object, representing a characteristic of the said object to be modified;
- dynamic animation means of the said scene, using animation frames, comprising, according to the order defined by the said mask, update data of the dynamic characterization fields of the said objects in order to modify them.

Other characteristics and advantages of the present invention will be better understood from the following detailed description. The description is of a preferred embodiment given as a non-limitative example and refers to the attached figures where:

FIG. 1 is a block diagram of a terminal, for example compatible with standard MPEG-4 and integrating the animation signal, or flow, of the invention.

Figure 1:
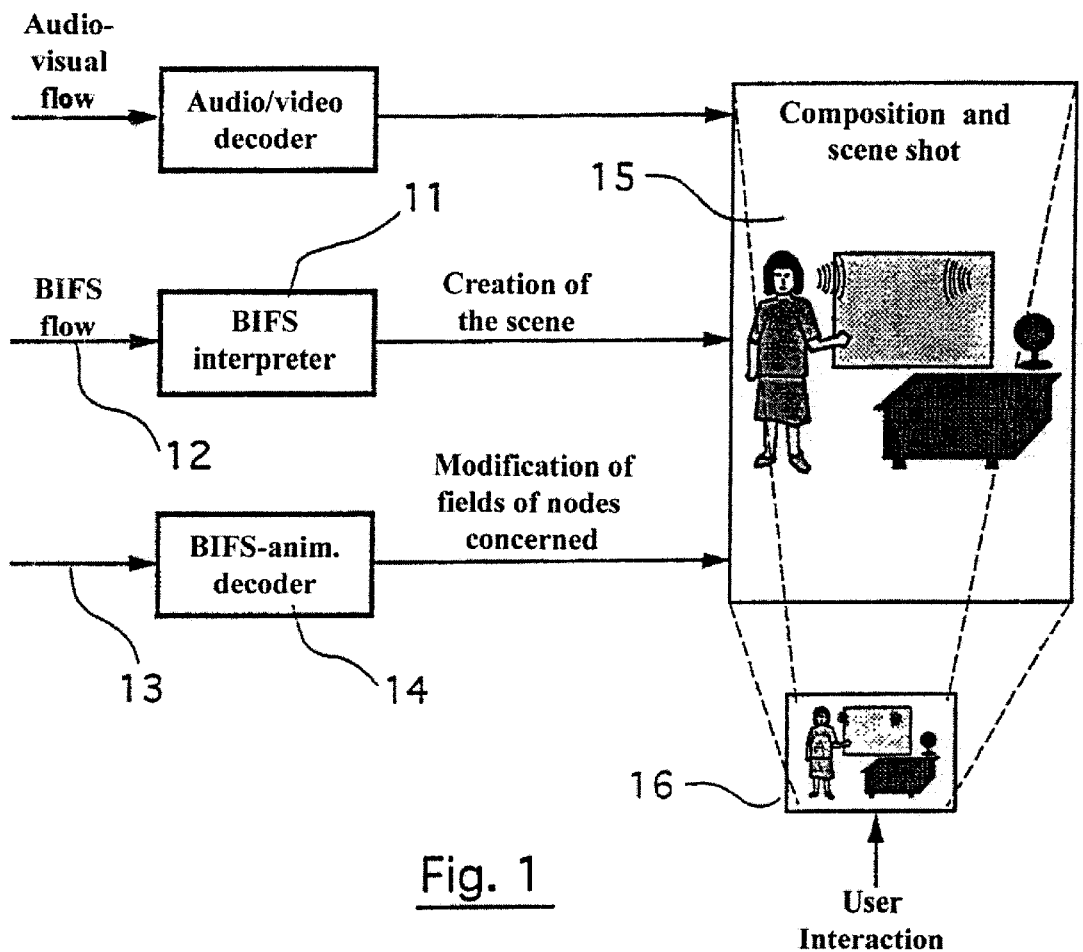
FIG. 1 illustrates the general principle of animation of a graphic scene according to the invention.

This terminal comprises means 11 for creating the original scene using a flow of data 12 in BIFS format, or animation mask. In other words, the terminal loads the graphic scene, which is described in terms of objects, or nodes.

It will be remembered that the aim of the scene description format is to describe the spatio-temporal relationships between the graphic objects of a scene. To do this, the BIFS format defines a certain number of "nodes" representing all the graphics primitives that are to be represented. Each of these nodes has predefined fields that represent characteristics of these nodes. For example, the field of the Circle primitive is a floating-number type "radius", while the parameter of the "Video Object" primitive is the start and end time of the video.

According to the invention, some of these nodes can be declared modifiable, allowing for future modifications. This may be expressed by the "DEF"mechanism in the VRML standard, and by a similar mechanism in the MPEG-4 system.

Once the scene is loaded, either on user request (interactive mode), or automatically (passive mode, also known as "push mode"), an animation flow known as "BIFS Anim" 13 is loaded and modifies the parameters of the scene.

The modification or animation is carried out by the decoder 14. For each new field value of the nodes involved in the animation, the decoder modifies the corresponding fields and these new values are used in the next scene shot loop. During the scene shot loop, for each node of the scene the graphic instructions are called up on the graphic processor that is used to draw the appropriate primitive.

An animated image 15 is thus obtained, that can be presented (16) to the user. Where necessary the user can intervene (17) by means of a suitable interface.

When an audio or video flow 18 is used, a similar mechanism 19 is used.

Figure 2:
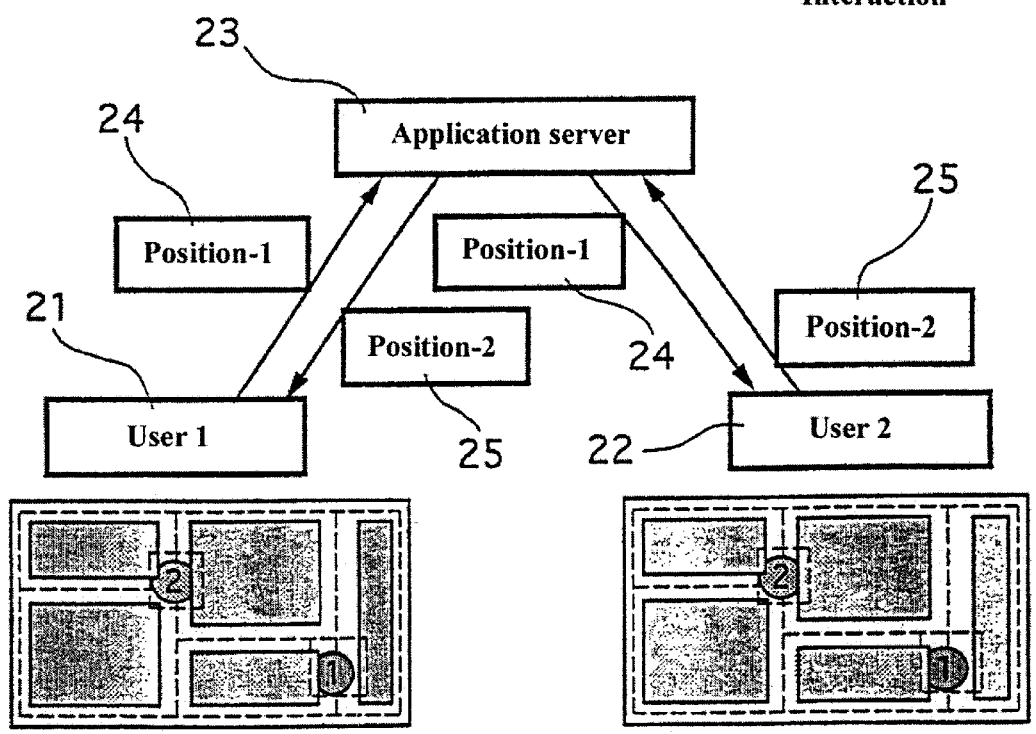
FIGS. 2 and 3 show two advantageous applications of the principle of the invention, respectively a multi-user application and an application in which the animation flow is computed in advance.

This technique has many applications. For example, FIG. 2 shows a multi-user game. The two users 21 and 22 load the original scene describing the game. The server 23 then declares to user 21 that it is going to receive successive positions 24 of user 22. These positions are transmitted (25) by the user 22 to the server 23, who then retransmits them to user 21. All the configuration data of the animation and the animation parameters (here the positions of user 22) form a "BIFS-Anim" flow 13. This transmission is symmetrical. User 21 uses the same method to send its positions to user 22.

Figure 3:
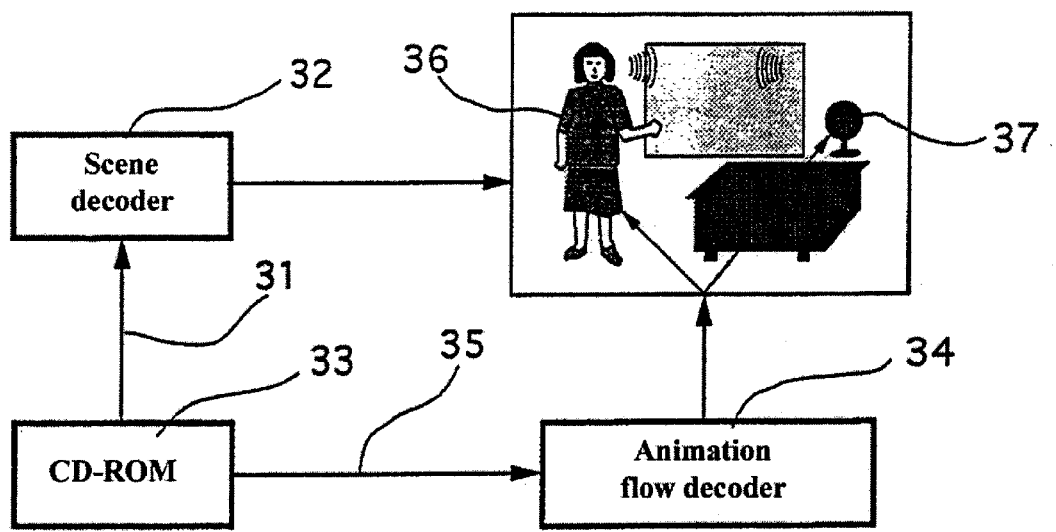

FIG. 3 shows another example of the use of animation flow, used in a context where it is computed in advance. File 31 describing the original scene is first loaded (for example from a CD-ROM 33) and is decoded by the scene decoder 32. The original scene is displayed, then the animation flow decoder 38 reads the animation parameters 35 and gives a synchronized animation of character 36 as well as the globe 37.

Figure 4:
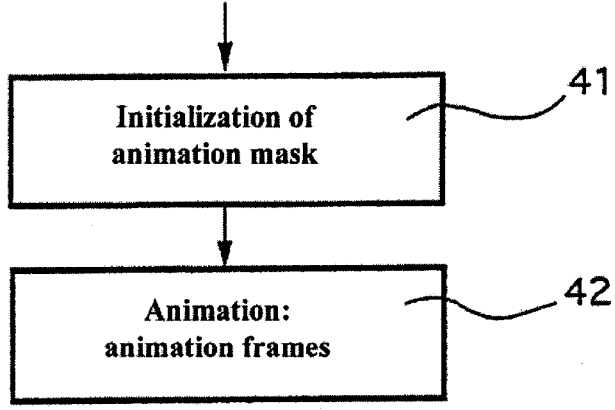
FIG. 4 is a general block diagram of the animation method of the invention.

FIG. 4 shows the general principle of the invention, given in successive stages. There are two successive stages, namely a stage 41 in which the original scene or initialization stage is constructed using an animation mask, and an animation stage 42 in which the scene is regularly updated by means of animation frames.

The general principle of the animation format consists in transmitting the following parameters:

Firstly, the configuration parameters of the animation, also called the animation mask, that describes the fields to be transmitted, specifying if necessary their quantification and compression parameters. The parameters can be chosen from fields of the eventIn or exposedFields type (as defined in the VRML standard) of nodes that have been declared modifiable in the scene. The animation mask is broken down into several elementary masks that define these parameters.

Next, animation data that are sent as a set of animation frames. An animation frame contains all the new values of the animation parameters for a given moment. These parameters can be sent in two different modes:

"Intra" mode. In this mode transmission of the parameters is absolute. In Intra mode it is possible to redefine new parameters for quantification.

"Predictive" mode in which the difference between this parameter and a prediction based on the previous samples is sent.

These animation parameters can be applied to all fields of all nodes of a scene that has previously been declared as capable of being animated. We will illustrate this by taking the Transform node in the VRML specification as an example. The specification of this node is given by:

Transform {
    evendIn MFNode addChildren
    evendIn MFNode removeChildren
    exposedField SFVec3f center 0 0 0
    exposedField MFNode children [ ]
    exposedField SFRotation rotation 0 0 1 0
    exposedField SFVec3f scale 1 1 1
    exposedField SFRotation scaleorientation 0 0 1 0
    exposedField SFVec3f translation 0 0 0
    field SFVec3f bboxCenter 0 0 0
    field SFVec3f bboxSize −1 −1 −1
}

In this example it will be seen that the fields:

rotation, scale, scaleOrientation, translation, are typically parameters of interest in animation.

It is therefore necessary to declare all the nodes that can be animated, in order subsequently to be able to designate the specific animation fields. One can then speak of a "dynamic" field. Dynamic fields must be designated in advance in our system in order to be able to use the most compact format possible for animation.

Only scalar values can be modified during animation. For example, referring to VRML standard 2.0, parameters of the following type can be animated:

SFInt32,

SFFloat,

SFDouble,

SFRotation,

SFColor.

All the previous type of tables of values may also be modified. In the case of a table-type value, it is possible either to modify the totality of fields, or to modify certain explicitly chosen values.

The signals used in the invention will now be described in more detail.

Animation masks represent fields to be transmitted, as well as their quantification parameters. For every node and value to be modified, a mask structure is used, the syntax of which is given below. The principle of the mask is to designate the dynamic fields that one wants to animate. The quantification parameters of each parameter may then be given.

Figure 5:
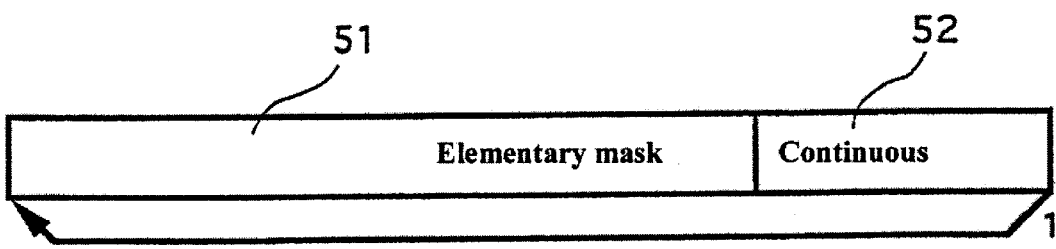
FIG. 5 shows the general structure of an animation mask according to the invention.

The structure of the configuration parameters of the animation may be represented as shown in FIG. 5.

The semantics of the parameters are as follows:

Elementary mask 51: Definition of the dynamic fields to be animated for this node, together with the corresponding quantification parameters.

Continuous 52 Bit set to 1 if there are other nodes to be animated in the same flow.

Figure 6:
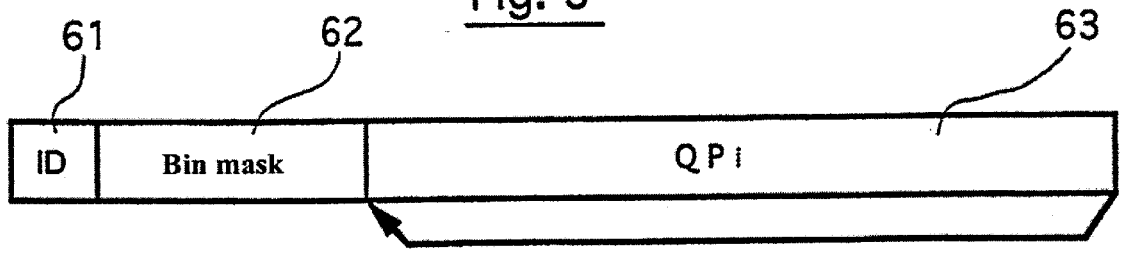
FIG. 6 shows the structure of an elementary mask of FIG. 5.

An elementary mask is illustrated in FIG. 6. The corresponding semantics are as follows:

ID 61: Sole identifier of the node to be modified. This identifier is known from the original scene.

Bin mask 62: binary mask of length equal to the number of dynamic fields of the type of animated node. 0 is sent if the dynamic field is not animated, 1 if it is.

In the case of multiple fields, it is also necessary to specify the indices of the fields to be modified. Where there are multiple indices to be modified, it may be decided to modify all the fields or only part of the vector. The syntax of the message is given in FIG. 7.

Qpi 63: Quantification parameters for the dynamic field i. There are as many quantification parameters as there are dynamic fields declared active in the binary mask. In particular, these fields can be empty where the quantification does not require any particular parameters. Determination of the syntax and the semantics of these fields known in advance by the server sending this animation flow.

Figure 7:
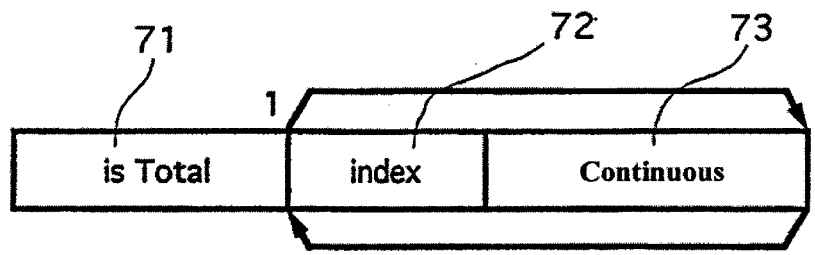
FIG. 7 shows a detail of the elementary mask of FIG. 6, in a situation where the fields have multiple values.

FIG. 7 shows details of the syntax of the binary mask for multiple value fields. The semantics are as follows:

isTotal 71: If this mask is set to 1, then all values of fields are to be modified. Otherwise certain elements of the vector to be modified are selected.

index 72: The index of the field in the vector to be modified.

Continue 73: If this flag is set to 1, this means that other elements of the vector are to be modified.

Advantageously, at least in certain situations, a predictive coding is used to reduce the number of data items to be transmitted in the information frames.

Compression of parameters can be achieved by using a DPCM type compression protocol: the values of a parameter may either be coded in "predictive" mode (P), or in "Intra" mode (I):

In P mode, for each new value of a field to be transmitted, the difference is coded in relation to the previous value. This difference is quantified then optimally represented by a variable length entropic coding.

In I mode, the dynamic field values are coded directly by using a simple quantification, then represented by a variable length code.

Figure 8:
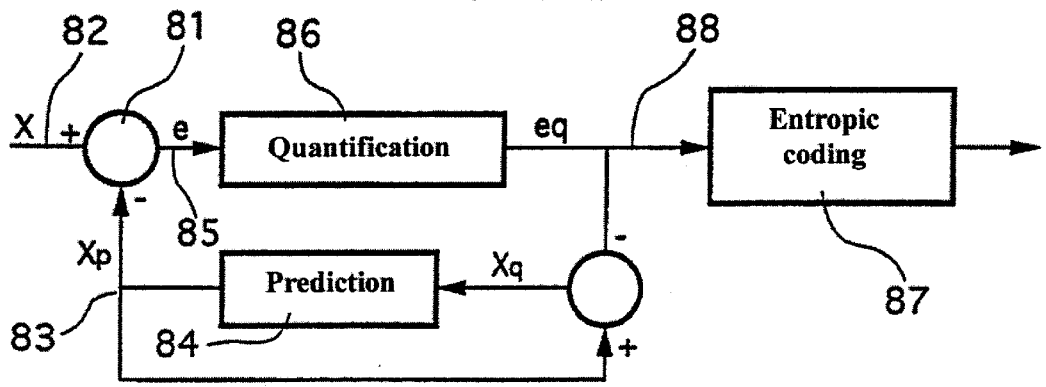
FIG. 8 is a diagram illustrating the coding of parameters transmitted according to the invention.

FIG. 8 is a block diagram describing the general compression algorithm. A subtraction (81) is made from the source data 82 of the estimated data 83 delivered by prediction means 84. The corresponding error signal 85 is quantified (86), then subjected to entropic coding 87. The quantified signal 88 feeds prediction means 84.

Figure 9:
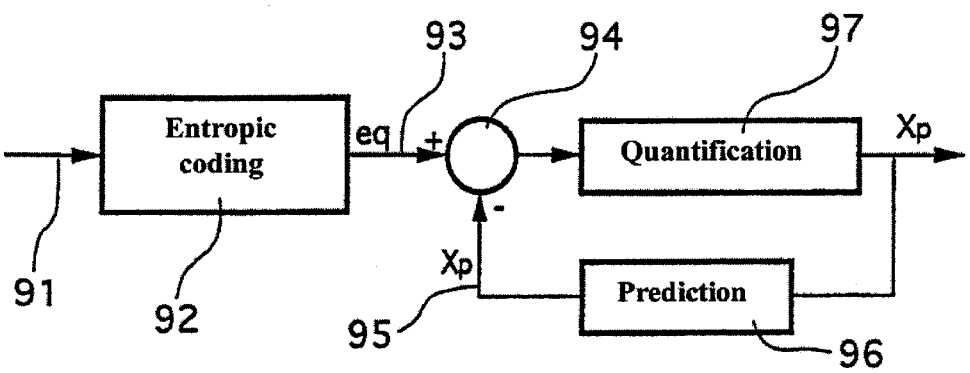
FIG. 9 shows the decoding of the parameters encoded in FIG. 8.

The corresponding process shown in FIG. 9 is used for decoding. Data received 91 are subjected to entropic decoding 92, then the signal 95 predicted by prediction means 96 is added (94) to the decoded signal 93. An inverse quantification (97) is then applied to the signal.

Figure 10:
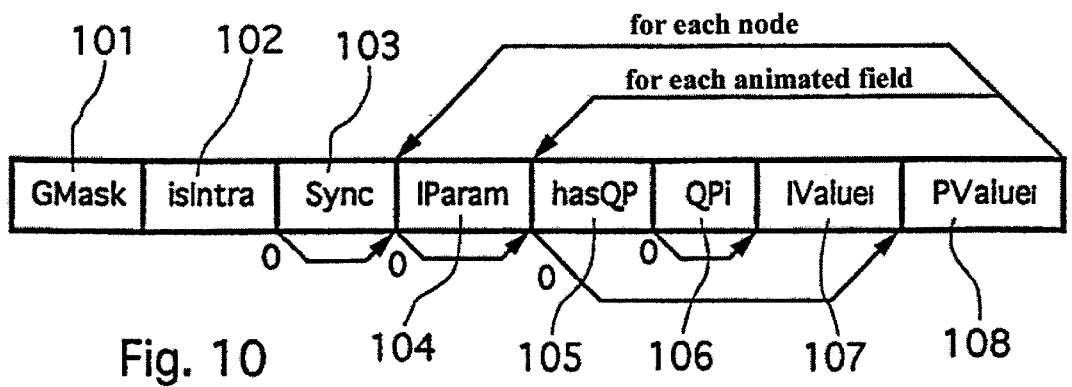
FIG. 10 is a block diagram of an animation frame according to the invention.

The flow of animation data can therefore have the structure illustrated in FIG. 10.

Each animation frame starts with a mask 101 of groups of values ("GMask"). This mask 101 consists of a series of binary elements "0" and "1" that specify for each node, in the order of the specification of the animation mask, whether animation parameters follow or not.

It is then specified, using the indicator 102 "isIntras", whether or not a predictive coding is used. If this indicator has the value "1", for example, the value will be coded in absolute ("Intra") mode. If it has the value "0", in the same example, a predictive coding is used.

If the "Intra" mode is used, a synchronization word 103 used to carry out a retiming operation in the flow can be provided.

Then, for each node animated, the following are transmitted:

optionally, in "Intra" mode, parameters 104 linked to the transmission ("Iparam"), such as:
  a synchronization reference or "time code" for the "Intra" frame in question;
  a new value for the animation frame frequency of the animated node;
  possibly a frame jump indicating that more data will be sent during N frames;
  a set of parameters, in the order of fields, with successively:

for an "Intra" coding, an indicator 105 "has QP" specifying if the values of quantification parameters are ("has QP"=1, for example) or are not ("has QP"=0, for example) redefined for the values that follow;

if "has QF"=1, the new value 106 of the quantification parameters "QPi";

the value 107 "Ivaluei" or 108 "Pvaluei", which is the coded value of dynamic field i in the selected mode (intra or predictive).

All types of quantification or entropic coding protocols can be used by the animation data coder, so various types of scalar or vectorial quantification can be used for quantification and any flow reduction protocol for entropic coding without loss.

In order to have interactive command of the start or stop of an animation flow, the invention offers a new node in BIFS or VRML format. This AnimationStream node is of the "Time Dependent Node" type in VRML terminology. The syntax of this node can be represented as follows:

AnimationStream {
    exposedField SFBool loop FALSE
    exposedField SFFloat speed 1
    exposedField SFTIME startTime 0
    exposedField SFTIME stopTime 0
    eventOut SFBool isActive
}

This node will be transported in the VRML BIFS animation flow. An example of the use of this node is given below. In this example, a cube is displayed. When the user clicks, the color, the position and the X size component can be animated. This example is given in ASCII format but may be transcribed in its binary version in BIFS. The original scene is given by:

DEFT Transform {
    Translation 00-5
    Children [
        DEF TOUCH TouchSensor { }
        Shape {
            appearance Appearance {
                material DEF M Material {
                    diffuseColor 111
                }
                geometry DEF Cube {
                    size 111
                }
            }
        }
    ]
}
DEF ANIMATION Animationstream {
loop TRUE
url "Scene.anim"
}
ROUTE TOUCH.toucthTime TO ANIMATION.set_starTime When the user clicks the mouse on the cube, the animation flow of the identifier "ANIMATION" is started. The animation or flow, or file, "Scene.anim" contains the following information:

T Identifier of the transformation
0001 Only the translation field is modified
1 The entire vectorial field of position will be animated
00405108 The position varies in the parallelepiped determined by points (0, 0 ,4) and (0,5,10), and 256 balls are used on the Ox axis to quantify in Intra mode 0-2-50376 The relative position varies in the cube determined by points (0, 0 ,4) and (0,0,10), and 64=2⁶−1 crowns in D3 on the $O_x$ axis to quantify in P mode 1 Continue M The color of the object is to be animated 010001 The color and the transparency of the object are to be animated 102408 Color varies in mode I between 10 and 240 on 8 bits −558 Color varies in P mode between 10 and 240 on 8 bits 102408 Same for transparency in I mode −558 Same for transparency in P mode 1 Continue C The size of the cube is to be modified 1 Its size is modified 0 Only certain details of the size vector are to be modified 0 The size of the cube is to be modified on the Ox axis only 25.55 The value varies between 0 and 5.5 in Intra mode, expressed on 5 bits −334 Relative value varies between −3 and 3 on 4 bits in P mode 0 End of animation mask

What is claimed is:

1. Animation data signal of a graphic scene, designed for means for constructing images capable of being presented on at least one screen, the graphic scene to be animated having previously been loaded into said image construction means as a set of objects, at least some of which having their own identification, comprising:

a single animation mask, delivered in advance to the animation, and allocating to at least one of the objects an elementary mask comprising:

the identifier of the object as defined in the graphic scene to be animated; and a description of at least one dynamic characterization field of the object, representing a characteristic of the object that can be modified; and animation frames, comprising, according to the order defined by the mask, data updating said dynamic characterization fields of the objects, such as to permit their modification, said construction means decoding the data of the animation mask, and initializing the animation using the mask, and updating said scene according to said animation frames.

2. Signal of claim 1, wherein each of the elementary masks comprises:

the identifier of the object; and a description block specifying active dynamic fields capable of being modified during animation, and dynamic fields that are invariable during animation.

3. Signal of claim 1, wherein at least some active dynamic fields are multiple fields forming a vector, and in that the elementary mask comprises a data item specifying whether all fields forming a vector, or only some of them, are active, a definition block being modified accordingly.

4. Signal of claim 1, wherein at least some dynamic fields are coded, in at least some of the animation frames, using a predictive coding, and in that in every animation frame, each dynamic field is associated with a data item specifying whether the dynamic field is coded in predictive or absolute mode.

5. Signal of claim 1, wherein the animation frames comprise:

a definition zone, indicating for each of the objects whether its animation parameters are transmitted in the animation frame; and an animation data zone, delivering the data necessary to the animation of objects listed in the definition zone.

6. Signal of claim 5, wherein the data animation zone comprises at least some data from a group comprising:

a type of coding;

a synchronization word;

a synchronization reference;

a frequency value of the animation frames for the object in question;

a jump of N frames during which a data item will not be sent;

an indication of change of value of a quantification parameter;

a new quantification parameter value; and a coded value of a dynamic field.

7. Signal of claim 1, wherein the dynamic fields belong to a group comprising:

fields defining an aspect of the object;

fields defining a position of the object;

fields defining a movement of the object;

fields defining a shape of the object; and fields defining an illumination of the object.

8. Signal of claim 2, further comprising a definition block of quantification data applicable to each of the active dynamic fields.

9. Method for transmitting animation data of a graphic scene designed to be presented on at least one screen, comprising:

an animation initialization stage in which transmission takes place of:

a single animation mask delivered as a preamble to an animation, and allocating to at least one object of a set of objects an elementary mask comprising:

an identifier of the object, as defined in the graphic scene to be animated; and a description of at least one dynamic characterization field of the object, representative of one characteristic of the object that can be modified; and an animation stage in which transmission takes place of animation frames comprising, according to an order defined by said mask, data updating the dynamic characterization fields of the objects, enabling them to be modified.

10. Animation device for a graphic scene designed to be presented on at least one screen, comprising:

means for constructing an initialization of an animation, using:

a single animation mask, delivered in advance to the animation, and allocating to at least one object of a set of objects an elementary mask comprising:

an identifier of the object, as defined in the graphic scene to be animated; and a description of at least one dynamic characterization field of the object, representing a characteristic of the object that can be modified; and dynamic animation means of the scene, using animation frames, comprising, according to an order defined by the mask, update data of the dynamic characterization fields of the objects in order to modify them.

\* \* \* \* \*